Figure 1:
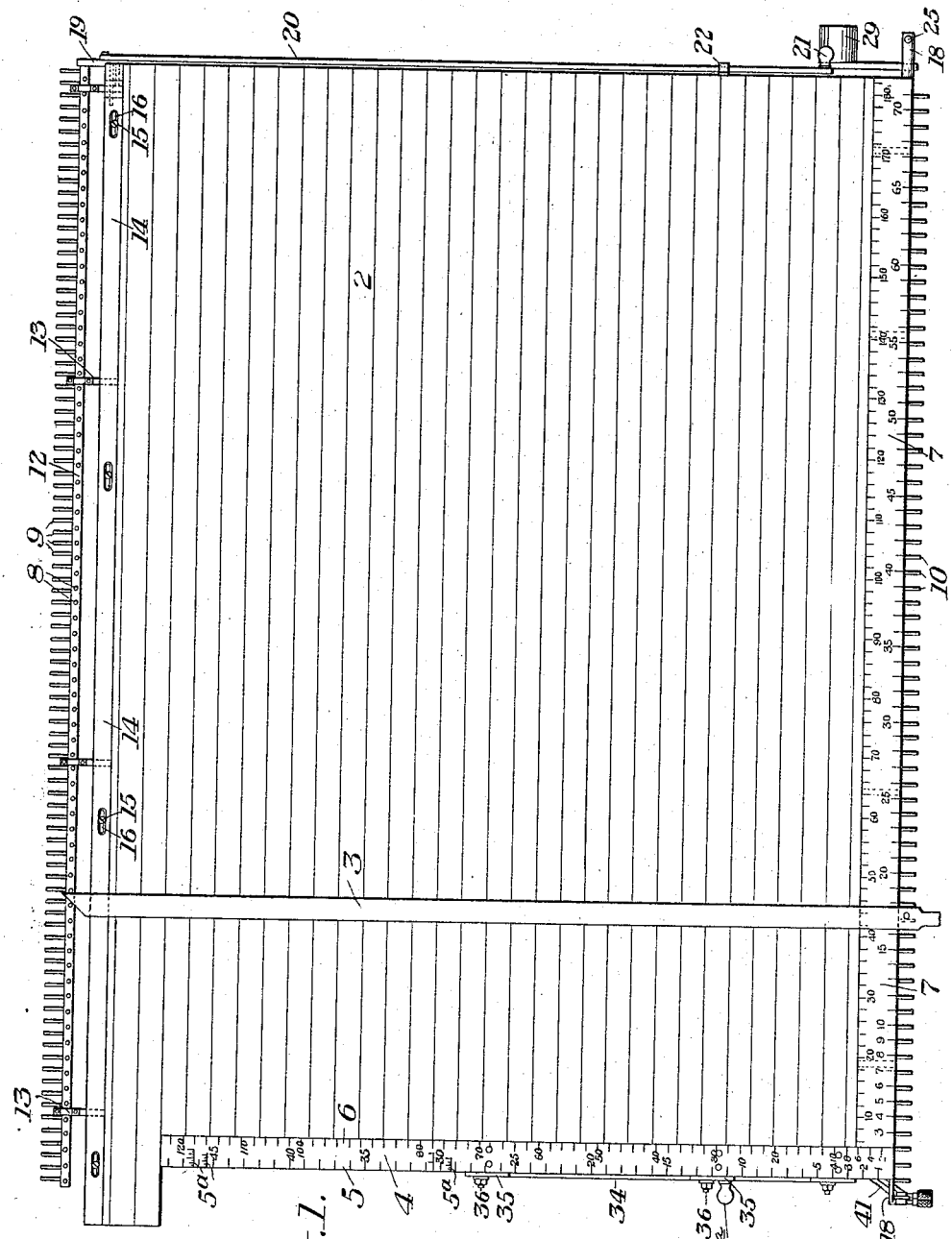

G. W. KLAGES.
GLASS CUTTING TABLE.
APPLICATION FILED JULY 1, 1914.

1,192,789.

Patented July 25, 1916.
4 SHEETS—SHEET 1.

WITNESSES
R A Balderson
Geo. L. Robinson.

INVENTOR
Geo. W. Klages
by Bakewell, Byrnes Parmelee
Attys.

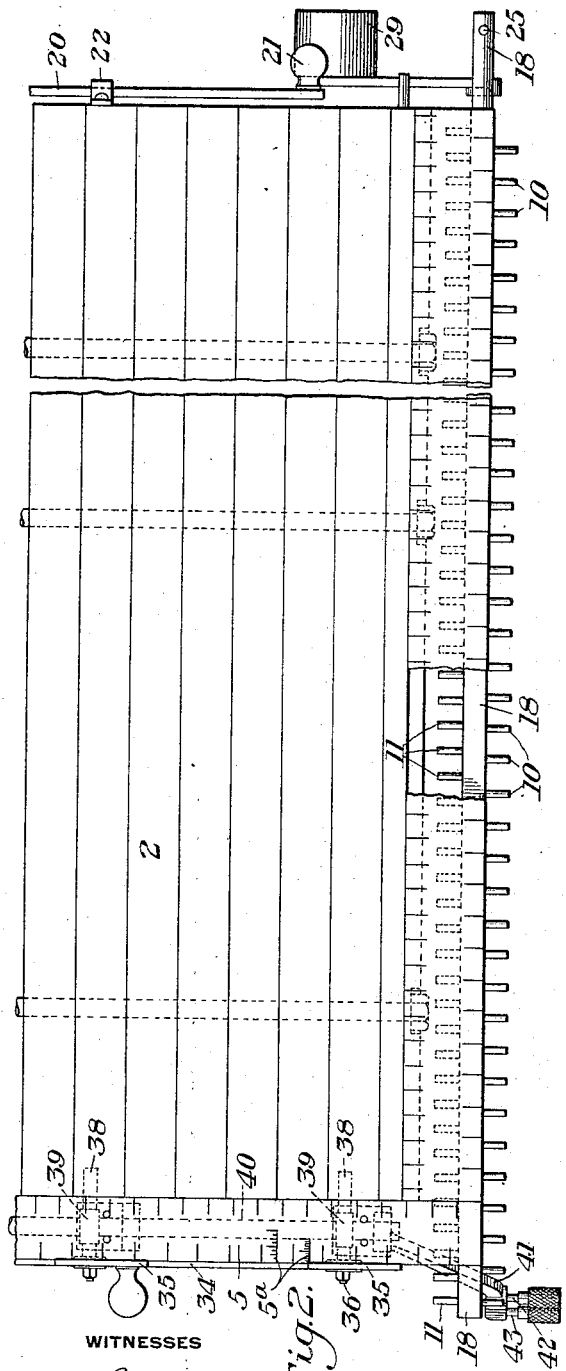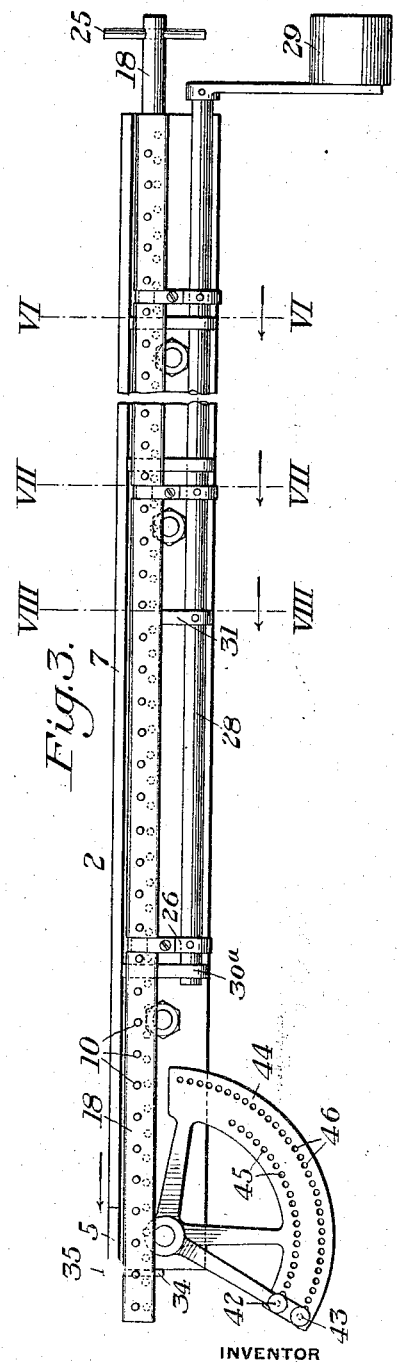

G. W. KLAGES.
GLASS CUTTING TABLE.
APPLICATION FILED JULY 1, 1914.
1,192,789.
Patented July 25, 1916.
4 SHEETS—SHEET 3.
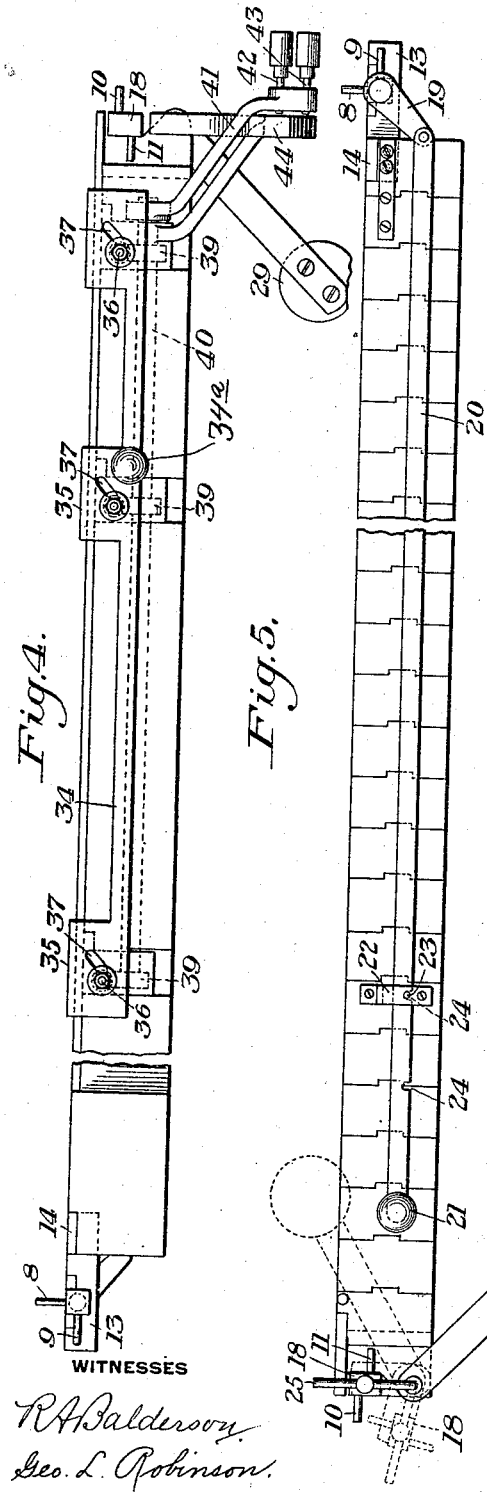
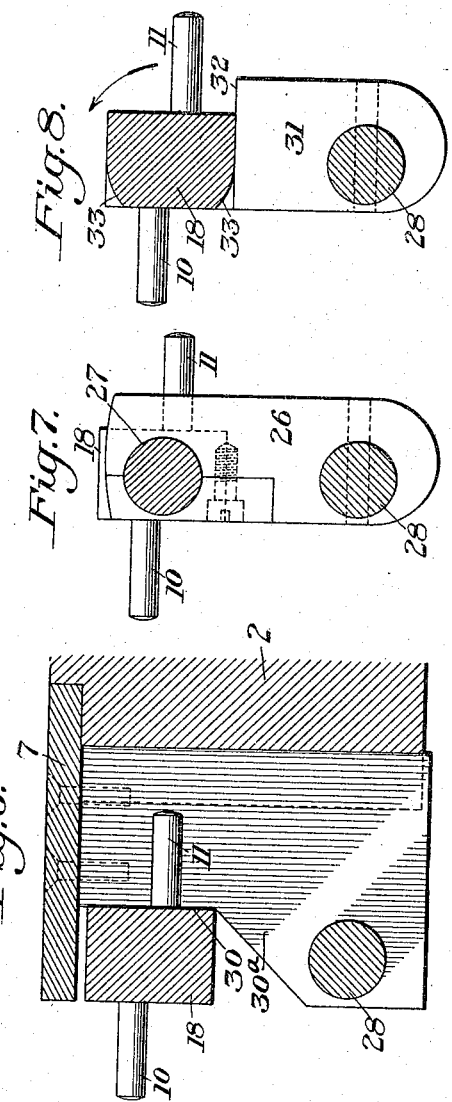
WITNESSES
R A Balderson
Geo. L. Robinson
INVENTOR
Geo. W. Klages,
by Bakewell, Byrnes & Parmeles
Attys

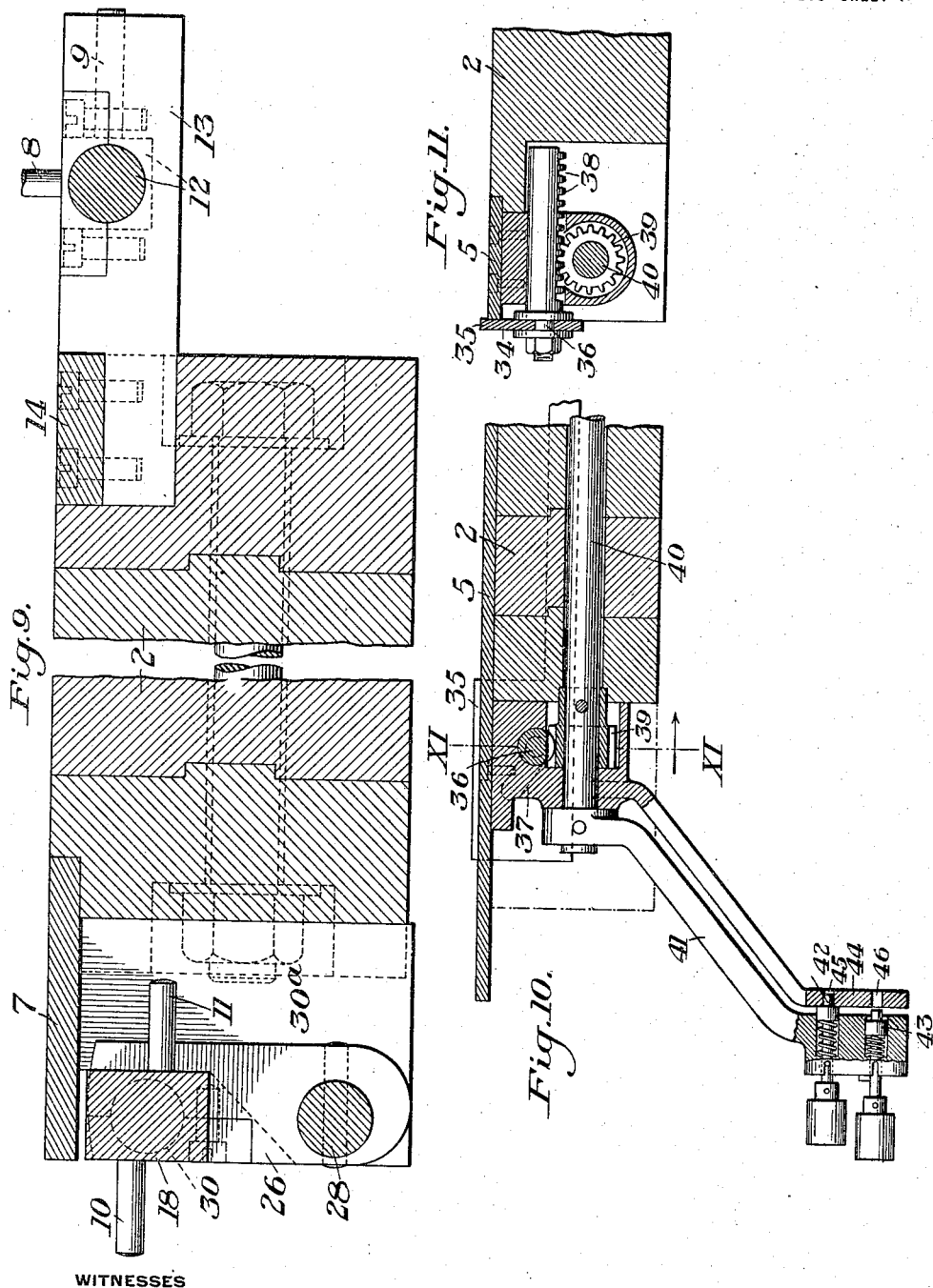

UNITED STATES PATENT OFFICE.

GEORGE W. KLAGES, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

GLASS-CUTTING TABLE.

1,192,789. Specification of Letters Patent. Patented July 25, 1916.

Application filed July 1, 1914. Serial No. 848,368.

*To all whom it may concern:*

Be it known that I, GEORGE W. KLAGES, a citizen of the United States, residing at Pittsburgh, in the county of Allegheny and State of Pennsylvania, have invented a new and useful Improvement in Glass-Cutting Tables, of which the following is a full, clear, and exact description, reference being had to the accompanying drawings, forming part of this specification, in which:

Figure 1 is a plan view of a glass cutting table embodying my invention. Fig. 2 is a plan view of a portion of the table, partly broken away on a larger scale. Fig. 3 is a side elevation of the table. Fig. 4 is an end view looking at the left hand end of Fig. 1. Fig. 5 is a similar view looking at the opposite end. Figs. 6, 7 and 8 are detail sectional views taken on the lines VI—VI, VII—VII and VIII—VIII, respectively, of Fig. 3, and Figs. 9, 10 and 11 are detail sectional views hereinafter more fully described, Fig. 11 being a section on the line XI—XI of Fig. 10.

My invention has relation to glass cutting tables such as are used for cutting plates or sheets of glass of various sizes.

The object of my invention is to provide a table of simple and convenient arrangement, by means of which plates or sheets can be cut to accurate sizes as measured in feet or inches or a fraction thereof, or a measure in accordance with the metric or any other system.

My invention provides a table of this character in which the change from one system to another can be readily made without difficulty and without the necessity for any mathematical computation on the part of the operator.

The nature of the invention in detail will be best understood by reference to the accompanying drawings, in which I have shown the preferred embodiment thereof, and which will now be described, it being premised, however, that various changes can be made in the details of construction and arrangement of the several parts to those skilled in the art, without departing from the spirit and scope of my invention, as defined in the appended claims.

Referring to the accompanying drawings, the numeral 2 designates a glass cutting table which may be, in general, of the usual construction.

3 designates the usual cutting rule which is movable longitudinally of the table to the proper position and which forms the straight edge along which the cutting tool is moved to cut the glass. This rule may be of the usual character.

4 designates a scale plate at one end of the table, having at one edge scale divisions 5 in feet and inches and at the other edge scale divisions 6 according to the metric system and denoting centimeter measurement. 7 is another scale plate extension along one edge of the table and also having two scales thereon similar to the scales 5 and 6. One of these scales is graduated in inches and the other into centimeter spaces. They may, however, be graduated to any subdivision of any system of measurements desired.

The usual table is provided at its edges with a series of gage pins with which the cutting rule 3 is engaged to hold it in its proper position for cutting. In accordance with my invention, I provide at each longitudinal edge of the table, two sets of these gage pins, the pins of the two sets being properly spaced with reference, respectively, to the two scales in the scale plate 7, and being so arranged that either set of these pins can be brought into use at will for engagement with the rule. The two sets of pins at one edge of the table are designated, respectively, by the numerals 8 and 9, and those at the opposite edge of the table by the numerals 10 and 11. The pins 8 and 9 are fixed in a longitudinal bar 12, which is mounted in suitable brackets 13 so as to be capable of being turned through an angle of 90°. The brackets 13 are preferably carried by a longitudinal plate 14 at the adjacent edge of the table which is secured thereto in a manner to admit of some longitudinal adjustment. The securing means may consist of screws 15 passing through oblong slots 16 in the bar 14. The pins 10 and 11 are carried by a longitudinal bar 18 which is mounted for rotation through an angle of 180°, or through an angle corresponding to the setting of the two sets of pins 10 and 11, so as to bring either set of pins in position for engagement with the end portion of the rule 3.

In every case the pins 8 and 9, and 10 and 11, will be spaced respectively in accordance with the particular systems of measurements for which the table is employed.

The bars 12 and 18 can be turned from one position to the other by any suitable means. I have shown the bar 12 as having a crank arm 19 at one end portion, with an actuating bar 20 connected thereto and extending across the end of the table, to be conveniently accessible, and where it is provided with a suitable actuating knob or handle 21. This bar passes loosely through a guiding and supporting bracket 22, having a pin 23 which may be engaged with either one of two notches 24 in the bar 20, for the purpose of holding the bar 12 in either of its fixed positions. The bar 18 is provided at one end with any suitable actuating means, such as the hand spikes 25. This bar is carried in a series of brackets 26 (see Figs. 6, 7 and 8), the bar having a journal portion 27 in each of these brackets. The brackets are in turn fixed to a rock shaft 28 extending longitudinally of the table. At one end this shaft has a counterweight 29, which normally holds the parts in the positions shown in full lines in the drawings. In this position the portions of the bar 18 intermediate adjacent brackets 26 have flat side portions which abut corresponding surfaces 30 on the brackets 30ª attached to the scale plate 7, as best shown in Fig. 6, and thereby prevent rotation of the bar. When, however, the counterweighted arm 29 is raised to the position shown in dotted lines in Fig. 5, the movement of the rock shaft 28 will swing the brackets 26 carrying the bar 18 to the position shown in dotted lines in said figure. In this position the bar 18 is free to be rotated through an angle of 180°. The bar 18 may also be provided with a latch device, consisting of a latch member 31 (see Fig. 8) carried by the rock shaft 28, and having a flat surface 32 upon which the bar 18 rests. At this point, said bar has the rounded surfaces 33 of such radius that when the bar is turned in the direction of the arrow (see Fig. 8), these curved surfaces will readily ride on the surface 32 to permit of a movement of the bar 18 through an angle of 180° only, when a stop is effected by the surface 32. Turning movement in the opposite direction is, however, prevented. The actuating means for the bars 12 and 18 may be located adjacent to each other, as shown in Figs. 1, 2 and 3, so that both can be operated at substantially the same time by the same operator.

The foregoing is a complete description of that part of my invention by which the table may be quickly changed from a condition in which one system of measurements is employed to a condition employing another system. This part of my invention may be used either with or without the further improvement next to be described. This feature of my invention has relation to a stop or gage which is designed to be used when cutting window or sheet glass to any size or unit obtainable by the spacing of the pins in the bars 12 and 18, or any fractional part of said spacing.

Ordinarily, the cutting of sheets of fractional sizes is a matter of considerable difficulty, for which an extra charge is made by the cutter.

My invention provides simple and convenient means whereby fractional sizes may be cut as readily as non-fractional sizes. The mechanism by which this is accomplished will now be described.

The front end of the table is provided with a transversely arranged stop plate 34 having upwardly extending portions 35 adapted to be projected above the surface of the forward edge of the table. This stop plate is mounted upon a series of studs 36, which engage oblique slots 37 in the plate. When the bar is moved endwise in one direction, (which may be done by using the knot 34ª as a handle) these slots will cause it to be elevated so as to bring the projection 35 above the edge of the table in the stopped position for the edge of the glass sheet or plate. When the bar is moved in the opposite position, the projections will be lowered flush with or below the table surface so as to permit the cut sheet to be slid thereover and removed from the table. When the plate 34 is set in the normal position, shown in Figs. 1, 2 and 3, and the glass sheets are moved up against the stop projections 35, the cuts made when the rule is properly adjusted will be in accordance with one or the other of the scales on the scale plate 7.

To take care of cutting fractional lengths, I provide means whereby the stop plate 34 may be moved toward or away from the end of the table. For this purpose, the studs 36, before referred to, are extended inwardly, as best shown in Fig. 11, and are provided with rack teeth 38 engaging pinions 39 on the transverse shaft 40 (see Fig. 11). Secured to one end of the shaft 40 is a depending lever arm 41 having two spring catch pins or dogs 42 and 43. Either one of these pins or dogs may be brought into operation, the other one being locked out of operable position by a partially rotary movement, as indicated in Fig. 10.

44 is a sector plate adjacent to the lever arm 41 and provided with two sets of perforations 45 and 46. The perforations 45 are arranged to be engaged by the pin or dog 42, and the perforations 46 by the pin or dog 43. The perforations 45 are spaced for obtaining fractions of an inch, while the perforations 46 are spaced for obtaining fractions of a centimeter. When, therefore, the lever arm 41 is moved to a certain position over the sector 44 and one of its spring dogs is engaged with one of the perforations, the stop plate 34 will be moved to an exactly corresponding position. If, for instance, it is desired to cut a piece of glass 9½ inches in length, the lever arm 41 would be moved over the sector to engage the proper perforation 45 for the ½ inch fraction. The rule being set at the 9 inch indication on the scale and the glass sheet being moved up against the top plate, the cut made would be 9½ inches from the front edge of the sheet. Where this feature of my invention is employed in connection with an ordinary table adapted to one system of measurements only, the sector plate 44 will, of course, have only one set of perforations.

It will be obvious that many changes can be made in the details of this part of my invention within the scope of the appended claims relating thereto.

If desired, the scale plate 5 may also be provided with the fractional scales 5ª, by which the front edge of the plate may be set independently of the stop mechanism just described.

The advantages of my invention will be apparent to those familiar with the use of glass cutting tables for window and other sheet glass. At the present time some of the orders received by glass manufacturing concerns give measurements according to the metric system, while others give measurements according to the old system. Unless two separate tables are provided, or the orders are translated from one system into the other, it is difficult to properly fill all such orders. By my system the table can be quickly converted in condition for use according to either system. The provision for means for taking care of fractional lengths intermediate the divisions of the scale plate 7 is also of great convenience, and greatly facilitates the work.

What I claim is:

1. A glass-cutting table having two sets of gage devices arranged in accordance with different systems, movable members carrying said devices, and shifting means for said members for displacing the devices of one set and bringing those of the other set into operative position, substantially as described.

2. A glass-cutting table, having a rotatable member provided with two sets of gage pins, and means for holding said member in each of its operative positions, substantially as described.

3. In a glass-cutting table, a member having two sets of gage pins for the cutting rule, one set of said pins being arranged in accordance with one system and the other set in accordance with another system, and shifting means for said member to bring either set of pins into operative position, substantially as described.

4. In a glass-cutting table, a member having two sets of gage pins for the cutting rule, one set of said pins being arranged in accordance with one system and the other set in accordance with another system, and shifting means for said member to bring either set of pins into operative position to the exclusion of the other, together with scales marked in accordance with the settings of the pins of respective sets, substantially as described.

5. A glass-cutting table having two members, each provided with two sets of gage devices, means for actuating said members to bring either set of gage devices into operative position, and means for holding said members in their adjusted positions, substantially as described.

6. A glass-cutting table having two sets of scales arranged in accordance with two different systems, two sets of gage devices, one corresponding to each scale, and a cutting rule having means for coöperation with either set of gage devices, substantially as described.

7. A glass-cutting table having two sets of scales arranged in accordance with two different systems, two sets of gage devices, one corresponding to each scale, a cutting rule having means for coöperation with either set of gage devices, the table also having an adjustable end stop for the glass sheet, and means whereby said stop may be shifted toward and away from the end of the table to any one of a plurality of different predetermined positions, substantially as described.

8. A glass-cutting table having two sets of scales arranged in accordance with two different systems, two sets of gage devices, one corresponding to each scale, a cutting rule having means for coöperation with either set of gage devices, the table also having an adjustable end stop for the glass sheet, and a setting device for said stop, said setting device having a plurality of different positions for each of said systems of measurement, substantially as described.

9. A glass-cutting table having a stop member movable longitudinally with relation to the table, means for effecting such movement, and means for securing the stop in a plurality of adjusted positions and in accordance with either one of two different systems of measurements, substantially as described.

10. A glass-cutting table having a stop at its delivery end, means whereby said stop may be raised to a stop position above the surface of the table and also lowered below the surface of the table to permit of the removal of the glass after cutting, substantially as described.

11. A glass-cutting table having a stop, means to permit said stop to be raised and lowered with respect to the surface of the table, and means whereby said stop may also be moved longitudinally of the table to any one of a plurality of different positions, each of which corresponds to a fragmentary part of the unit of measurement employed in the cutting, substantially as described.

In testimony whereof, I have hereunto set my hand.

GEORGE W. KLAGES.

Witnesses:
ALICE A. TRILL,
GEO. H. PARMELEE.

Copies of this patent may be obtained for five cents each, by addressing the "Commissioner of Patents, Washington, D. C."